United States Patent [19]

Heaton

[11] Patent Number: 5,096,870
[45] Date of Patent: Mar. 17, 1992

[54] PREPARATION OF IRON NITROSYL CARBONYL CATALYST

[75] Inventor: Duane E. Heaton, Lake Jackson, Tex.

[73] Assignee: The Dow Chemical Company, Midland, Mich.

[21] Appl. No.: 578,109

[22] Filed: Sep. 5, 1990

[51] Int. Cl.$^5$ .............. B01J 21/18; B01J 31/20; B01J 31/18; C01G 1/04
[52] U.S. Cl. ................. 502/174; 423/365; 423/417; 502/161; 502/200; 585/369
[58] Field of Search .......... 502/174, 161, 200; 423/365, 386, 417; 585/369, 370

[56] References Cited

U.S. PATENT DOCUMENTS

| | | | |
|---|---|---|---|
| 2,473,993 | 6/1949 | Gresham et al. | 502/161 |
| 3,377,397 | 4/1968 | Maxfield | 585/369 |
| 3,448,129 | 6/1969 | Maxfield | 556/28 |
| 3,481,710 | 12/1969 | Maxfield | 423/386 |
| 3,551,467 | 12/1970 | Akakawa et al. | 556/140 |
| 3,954,665 | 5/1976 | Tkatchekno | 502/161 |
| 4,006,168 | 2/1977 | Kerr | 549/257 |
| 4,144,278 | 3/1979 | Strope | 585/508 |
| 4,181,707 | 1/1980 | Strope | 423/386 |
| 4,234,454 | 11/1980 | Strope | 502/162 |
| 4,238,301 | 12/1980 | Petit et al. | 204/59 R |
| 4,973,568 | 11/1990 | Heaton | 502/174 |

OTHER PUBLICATIONS

D. Ballivet-Tkatchenko, Inorganica Chimica Acta, vol. 30, pp. 2-289-L290 (1978).
E. LeRoy et al., Tetrahedron Letters, vol. 27, pp. 2403-2406 (1978).
P. L. Maxfield, Inorg. Nucl. Chem. Letters vol. 6, pp. 707-711 (1970).
J. P. Candin et al., J. Chem. Soc. (C), pp. 1856-1860 (1968).
I. Tkatchenko, Journal of Organometallic Chemistry, vol. 124, pp. C39-C42 (1977).
Gerald E. Gadd et al., Organometallics, pp. 391-397 (1987).
A. Mortreux et al., Applied Catalysis, vol. 24, pp. 1-15 (1986).

Primary Examiner—Paul E. Konopka

[57] ABSTRACT

Catalysts suitable for the dimerization of a diolefin, e.g. butadiene to 4-vinylcyclohexene, are prepared by reacting (1) iron chloride and sodium nitrite or alternatively (2) iron nitrosyl chloride with (3) carbon monoxide in an organic solvent in the presence of iron. The catalyst solution is preferably filtered prior to use. While the reaction employing iron chloride and sodium nitrile is preferred, the catalyst produced by either method contains a minimum of reducing agent and by-products. It can be isolated and stored in the absence of diolefin monomer and carbon monoxide while retaining its stability and activity.

17 Claims, No Drawings

PREPARATION OF IRON NITROSYL CARBONYL CATALYST

BACKGROUND OF THE INVENTION

The present invention relates to a process for the preparation of iron nitrosyl carbonyl.

The complex, iron nitrosyl carbonyl [Fe(NO)$_2$(CO)$_2$], is known to dimerize butadiene to produce vinyl cyclohexene (VCH). Methods known to prepare various iron nitrosyl complexes require reduction of [Fe(NO)$_2$Cl]$_2$ or reaction of nitric oxide (NO) on a mixture of iron and FeCl$_3$. Reference to these methods is found in U.S. Pat. No. 4,238,301. Another patent, U.S. Pat. No. 4,234,454, discloses the preparation of various metal nitrosyl catalytic solutions by employing the combination of manganese, zinc or tin together with iron, cobalt or nickel nitrosyl halides to produce the respective metal nitrosyls in a system for dimerizing various conjugated dienes. An earlier patent, U.S. Pat. No. 3,510,533, discloses the dimerization of conjugated dienes with $\pi$-allyldinitrosyliron complexes and a method for their preparation. Several methods are given involving the reduction of a $\mu,\mu'$-dihalotetranitrosyldiiron.

The dimerized products of the process of the invention may be useful in themselves or as intermediates to other products. Thus, for example, 4-VCH can be (1) chlori-nated to make an insecticide, (2) oxidized to make benzoic acid, (3) reacted with hydrogen sulfide in the presence of acid-type catalysts to make sulfur-containing resins and (4) reacted with hydrogen sulfide in the presence of ultraviolet light to make a $\beta$-mercaptoethyl cyclohexane.

In copending U.S. application Ser. No. 07/348,625, filed May 8, 1989, (Heaton) which is incorporated by reference herein in its entirety, Heaton has demonstrated that an iron nitrosyl carbonyl catalyst effective for dimerizing olefins can be prepared by reacting an iron, cobalt or nickel chloride and an alkali metal nitrite or an iron cobalt or nickel nitrosyl chloride with carbon monoxide (CO) in the presence of a readily oxidizable metal exemplified by tin, zinc, manganese or magnesium. Certain by-products have been observed in the product produced by such a process. The product is stable when stored under CO, but when the CO is replaced by e.g. nitrogen (N$_2$), the concentration of Fe(NO)$_2$(CO)$_2$ decreases.

It would be desirable to produce an iron nitrosyl carbonyl catalyst such that there were fewer by-products and more stability.

SUMMARY OF THE INVENTION

The present invention is a process for preparing iron nitrosyl carbonyl comprising contacting (a) iron, cobalt or nickel chlorides and an alkali metal nitrite or (b) iron, cobalt or nickel nitrosyl chlorides with (c) carbon monoxide in a solvent therefor and in the presence of iron metal.

DETAILED DESCRIPTION OF THE INVENTION

In general, the catalysts of this invention are suitable for dimerizing to cyclic products the class of conjugated diolefins. While butadiene is exemplified to make 4-VCH, other conjugated dienes can be cyclized similarly. Thus, isoprene and other conjugated diolefins can be dimerized to cyclic compounds.

While ferric chloride is the preferred compound to be employed in forming the complex used in the catalyst of the invention, other compounds are useful in preparing the catalysts. Thus, for example, [Fe(NO)$_2$Cl]$_2$, FeCl$_2$ and the like are useful for the preparation. Analogous compounds of cobalt and nickel are useful in preparing the analogous catalysts, but such catalysts are not as active as the iron catalysts. When an iron compound not containing the NO moiety is used, then a source of NO is needed.

The iron, cobalt or nickel nitrosyl chloride, preferably dinitrosyliron chloride, used in the present process may be prepared by conventional means, in particular according to the following reaction:

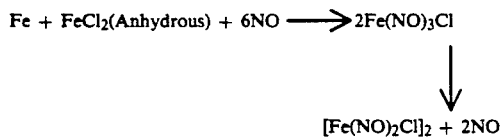

Alternatively, the comound may be prepared by the reaction of a source of nitric oxide (NO) with an iron chloride. If desired, the product obtained may be further purified by means within the skill in the art e.g., sublimation.

The iron chloride used is either ferrous chloride, FeCl$_2$, or ferric chloride, FeCl$_3$. The salts may be dried before use. The source of NO (the nitrosyl radical) is advantageously a nitrite salt, preferably an alkali metal or alkaline earth nitrite salt, e.g. sodium nitrite or a nitrogen oxide, preferably nitric oxide. The nitrite salts are commercially available. Nitric oxide, NO, is preferably used in the gaseous state, and is advantageously the commercially available liquified bottled gas and is preferably introduced with the CO gas.

The mole ratio of iron halide to source of NO is suitably from about 1:6 to about 1:1, preferably from about 1:2 to about 1:4. The mole ratio of iron to NO source is suitably from about 1:4 to about 8:1, preferably from about 1:4 to 4:1.

The carbon monoxide (CO) is suitably obtained from any source, e.g. commercially as a liquid (under pressure) or a gas, or obtained chemically, e.g. from reaction of calcium carbonate with zinc. The CO is suitably provided to the reaction by any means, advantageously by bubbling (sparging) through the reaction medium or by the reaction medium being pressurized with CO. Agitation and mixing are preferably maintained during the reaction. Carbon monoxide is preferably supplied at pressures of at least about 0–2000 psig (0 to 13782 KPag) relative to atmospheric pressure, more preferably from about 0 to about 1000 psig (6891 KPag), most preferably from about 0 to about 250 psig (0 to 1723 KPag). Zero psig corresponds to sparging CO through the reacting solution at atmospheric pressure. Advantageously sparging is continued at least as long as the reaction mixture is heated.

The iron metal is suitably used in any form in which it is readily oxidizable, preferably in a powder or granular form or other high surface area form, that is preferably a form having a surface area of at least about 0.01 m$^2$/g, more preferably at least about 0.1 m$^2$/g. Low surface area forms such as lumps or bars are preferably avoided. Suitably any excessive purity of iron is useful in the practice of the invention, but to maintain purity of the product, at least about 95 weight percent iron is preferred. More preferably, the iron is at least about 98 weight percent pure.

Organic solvents which may be used include ethers, such as diethyl and dibutyl ethers, tetrahydrofuran (THF), diethyleneglycol dimethyl ether (diglyme), ethyleneglycol dimethyl ether (monoglyme) and the like; organic esters such as propylene carbonate, ethylene carbonate and ethyl acetate; nitriles such as acetonitrile and benzonitrile; and organic amides such as formamide and dimethylformamide (DMF). Preferred solvents are propylene carbonate and diglyme.

Any temperature and pressure at which the reaction takes place are suitable reaction conditions but it is preferable to keep CO in the organic solution and avoid decomposition. Preferred temperatures are from about ambient to about 250° C., more preferably from about 60° C. to about 150° C., because a lower temperature is too slow for convenience and a higher temperature can cause some decomposition. Preferred pressures are generally those sufficient to maintain CO in solution from about 0 psig (0 kilopascals) (KPag) to as high as the vessel used allows, preferably to about 1000 psig (6891 KPag), more preferably from about 10 psig (68.9 KPa) to about 250 psig (1723 KPag) because lower pressure puts less CO in solution and higher pressure requires special equipment designed for high pressure.

The time of reaction will vary with the amounts of material present and with the pressure and temperature. Generally a time of from about one to 48 hours is operable, but a time of no longer than about 24 hours is usually sufficient to complete the reaction.

The iron nitrosyl carbonyl is particularly useful for dimerizing butadiene into vinyl cyclohexene.

Iron nitrosyl carbonyl catalyst produced in the practice of the invention is observed to have fewer by-products than that produced using other oxidizable metals, e.g. tin or magnesium rather than iron. It is observed that the catalyst prepared using magnesium as the metal has by-products evidenced by infrared (IR) spectral peaks at: 2012 (med), 1996 (str), 1985 (str), 1914 (str), 1878 (str) and 1715 (wk) cm$^{-1}$ (where med means medium, str means strong and wk means weak). Using tin metal produces a product evidencing by-product peaks in the IR at: 2020 (med), 1998 (med), 1937 (str) and 1714 (str) cm$^{-1}$. In contrast, use of iron according to the practice of the invention produces purer $Fe(NO)_2(CO)_2$ as evidenced by IR peaks at 2088 (med), 2039 (str), 1804 (str) and 1761 (str) cm$^{-1}$ in the region of interest (from 1600 to 2200 cm$^{-1}$) but not at the positions noted for the other metals.

After preparation of iron nitrosyl carbonyl using other readily oxidizable metals and when the carbon monoxide is replaced by another gas, preferably an inert gas like nitrogen, deterioration is observed. The IR peaks characteristic of the product are replaced by other peaks, and the product loses activity as a catalyst. Where, after 2 days under nitrogen, the catalyst prepared using iron has an IR spectrum unchanged from that of initial product, the product prepared using tin loses its characteristic peaks within 1 to 5 hours and evidences peaks at 1996 (str), 1757 (med) and 1715 (med) cm$^{-1}$, with the peaks evidencing $Fe(NO)_2(CO)_2$ hardly visible.

These observations of fewer by products and better stability without CO, indicate that the product prepared using iron is advantageous for use as a catalyst in dimerizing olefins. Activity is preserved when deterioration is avoided and fewer by-products in the catalyst result in fewer by-products in the product. Furthermore, precipitation of solid materials is observed when olefins, e.g. butadiene, are dimerized using an iron nitrosyl carbonyl catalyst prepared using an oxidizable metal like tin. These solid materials foul equipment. Use of iron as the oxidizable metal according to the practice of this invention produces a catalyst which results in much less solid materials, preferably less than 0.01 g of solid precipitate when 10 g of a solution of 0.5 weight percent catalyst is used. (By way of comparison, up to a gram of precipitate is produced in the same butadiene dimerization when the catalyst is prepared using tin.)

Conditions for the dimerization are within the skill in the art and are operable with the catalysts prepared by the process of the present invention. Temperature ranges are preferably from about 20° to about 175° C.; pressure ranges are from about atmospheric to about 1,000 psig (6891 KPa); and the reaction is preferably conducted for a period of time of from about 10 minutes to about 24 hours.

The following examples are representative of the catalyst preparation and its use. Examples (Ex.) of the invention are designated numerically, while Comparative Samples (C.S.) are designated alphabetically. All percentages and parts are by weight unless designated otherwise. All materials are handled under conditions of inert atmosphere (e.g. nitrogen or CO).

Example 1

Preparation and Use of Iron Nitrosyl Carbonyl

A 20 mL autoclave cell constructed of 316 stainless steel is equipped with a cylindrical internal reflectance crystal to allow monitoring of the mixture directly by IR. In the autoclave is placed 20.00 g of propylene carbonate, 0.51 g Fe powder, 0.30 g $NaNO_2$ and 0.42 g $FeCl_3$ to form a solution. The autoclave is sealed and placed in an IR optical bench. The autoclave is purged with CO and pressurized to 90 psig and stirred. The mixture is then heated at 120° C. for 20 hours while monitoring by IR. The mixture is cooled, and the autoclave opened in a drybox. The solution is filtered using a 1 micron syringe filter.

A standard autoclave is suitable as a reactor if a predetermined stop time is used or samples are intermittently removed and analyzed for completeness of reaction.

The filtered solution is useful as a butadiene dimerization catalyst.

The reactor for dimerization is a 300 mL, 316 stainless steel autoclave with a cooling coil for temperature control, and a process control system commercially available from The Dow Chemical Company under the trade designation Camile® which allows automated sampling for analysis on a gas chromatograph (GC) commercially available from Varian Associates, Inc. under the trade designation Varian 3700. The chromatography column is a fused silica capillary column with a film thickness of 1.50 micrometers commercially available from J&W Scientific under the trade designation DB-1. Analyses are performed isothermally at 60° C. All materials are handled under inert atmosphere conditions.

1,3-butadiene (130.0 g) is pressured into the reactor at 125 psig of $N_2$ and heated to 80° C. with stirring. When the temperature is stabilized, 10.0 g of catalyst solution as obtained from filtration above and 5.0 g n-octane (as a GC standard) are pressured into the reactor at 300 psig (2067 kPa). The mixture is maintained at 80° C. with stirring for 10 hours at which time the mixture is analyzed and shows 48.0 mole percent conversion to 4-vinycyclohexene with 100% selectivity.

EXAMPLE 2

Preparation and Use of Iron Nitrosyl Carbonyl

The procedure of Example 1 is followed except that 20.00 g propylene carbonate, 0.60 g Fe powder, 0.31 g NaNO$_2$ and 0.41 g FeCl$_3$ are used, and the reactor is pressurized to 120 psig and heated at 120° C. for 65 hours.

After filtration, a 10 g sample of catalyst solution is used in a dimerization reaction using the procedure of Example 1. The mixture is maintained at 80° C. with stirring for 10 hours, at which time the mixture is analyzed and shows 87.2 mole percent conversion to 4-vinylcyclohexane with 100% selectivity.

Example 3

Larger Scale Preparation and Use of Iron Nitrosyl Carbonyl

A 35 gallon Pfaudler kettle is used as a reactor. Into the reactor are placed 10 gallons of diglyme (dimethyl ether of diethylene glycol). The agitator is started and the following solids are added: 2500 g Fe powder, 1200 g FeCl$_3$, and 1500 g NaNO$_2$. The vessel is pressurized to 65 psig with CO and heated at 100° C. for 48 hours. A sample at 24 hours is identical by IR with a sample at 48 hours and indicates the reaction is complete at 24 hours. The reaction is cooled to ambient temperature and agitation is stopped to allow solids to settle. The solution is then filtered through 1 micron filters and stored under 40 psig of CO.

Ten grams of the catalyst solution and 5.0 g n-octane are used in a dimerization procedure like that of Example 1. After 10 hours at 80° C. the mixture is analyzed and shows 76.5 mole percent conversion to 4-vinylcyclohexene with 100% selectivity.

While the high purity catalyst produced in the practice of the invention is very suitable for use without further purification it is also suitably purified by dissolution or preparation in a solvent for the catalyst such as diglyme and subsequent separation by addition of a miscible non-solvent for the catalyst such as water or octane, such as is taught in copending U.S. application Ser. No. 578,108 filed Sept. 5, 1990, which is incorporated by reference herein in its entirety.

What is claimed is:

1. A process for preparing iron nitrosyl carbonyl comprising contacting (a) iron, cobalt or nickel chlorides and an alkali metal nitrite or (b) iron, cobalt or nickel nitrosyl chlorides with (c) carbon monoxide in a solvent therefor and in the presence of iron metal.

2. The process of claim 1 wherein the organic solvent is an organic ether.

3. The process of claim 2 wherein the organic ether is a cyclic ether.

4. The process of claim 2 wherein the organic ether is a glycol ether.

5. The process of claim 1 wherein the organic solvent is an organic ester.

6. The process of claim 5 wherein the organic ester is an alkylene carbonate.

7. The process of claim 6 wherein the alkylene carbonate is propylene carbonate.

8. The process of claim 2 wherein the ether is diglyme.

9. The process of claim 1 wherein the organic solvent is an organic nitrile.

10. The process of claim 1 wherein the organic solvent is an amide.

11. The process of claim 1 wherein the reaction is conducted at a pressure of from about atmospheric (about 0 psig) to about 1,000 psig.

12. The process of claim 10 wherein the reaction is conducted at a temperature of from about ambient to about 250° C.

13. The process of claim 1 which comprises reacting iron chloride and sodium nitrite with carbon monoxide in an organic solvent in the presence of iron powder.

14. The process of claim 1 wherein the iron metal has a surface area of at least about 0.01 m$^2$/g.

15. The process of claim 1 wherein the iron metal has a surface area of at least about 0.1 m$^2$/g.

16. The process of claim 1 wherein the iron metal is in powder or granular form.

17. The process of claim 1 wherein the mole ratio of iron halide to alkali metal nitrite or nitrosyl chloride (together, NO source) is from about 1:6 to about 1:1 and the mole ratio of iron metal to NO source is from about 1:4 to about 8:1 and the temperature and pressure are those at which iron nitrosyl carbonyl is formed.

* * * * *